United States Patent [19]
Fletcher

[11] 3,871,229
[45] Mar. 18, 1975

[54] DROP SENSING APPARATUS
[75] Inventor: John H. Fletcher, Stamford, Conn.
[73] Assignee: Data Service of America, Inc., Norwalk, Conn.
[22] Filed: Jan. 2, 1974
[21] Appl. No.: 429,788

[52] U.S. Cl. ............ 73/204, 128/214 E, 128/214 C
[51] Int. Cl. .......................... G01f 1/00, A61m 5/16
[58] Field of Search ....... 73/204; 128/214 E, 214 F, 128/DIG. 13

[56] References Cited
UNITED STATES PATENTS
3,390,577   7/1968   Philps et al. ......................... 73/194
3,655,095   4/1972   Kientz ................................. 128/214

Primary Examiner—Herbert Goldstein
Attorney, Agent, or Firm—St. Onge, Mayers, Steward & Reens

[57] ABSTRACT

Control apparatus for a drop-feed intravenous system includes an enclosure having a thermally responsive probe sensor on which a succesion of liquid drops impinge. The sensor is insulated electrically from the drop stream but is thermally coupled to the stream to generate pulses at a rate corresponding to the periodicity of the falling drops. These pulses are compared with an adjustable reference pulse rate and any differential detected is used to regulate the liquid flow and thus to adjust the drop rate to the reference rate. Aural and visual alarm systems respond to out-of-limit conditions detected by the monitoring system.

6 Claims, 13 Drawing Figures

PATENTED MAR 18 1975

DROP SENSING APPARATUS

BACKGROUND

The present invention relates generally to improvements in automatically regulating the flow of liquids, and more particularly to improved apparatus useful for sensing and controlling drop-by-drop liquid flow.

In medical usage, an intravenous liquid injection system usually comprises a bottle of liquid supported in an inverted position, an intravenous feeding tube connected indirectly to the inverted bottle opening, and a suitable valve mechanism, such as a manually adjustable clamp, which allows the liquid to reach the feeding tube at a controlled drop rate. A "drop chamber" interposed between the bottle and the feeding tube allows a nurse or other attendant to observe the rate at which the liquid drops out of the bottle and also maintains a sealing body of liquid at the lower end of the chamber to ensure that no air enters the feeding tube or is conducted to the patient.

Automatic techniques, employing in the one case photocell drop sensors, and in the other case capacitative drop sensors, have been used for controlling the rate of liquid flow. However, photocell drop sensors are expensive and have been found subject to inaccuracy because of extraneous light signals such as the flickering of fluorescent lighting and because some part of the light path may be obstructed by the deposit on wall surfaces of a residue from the liquid being monitored. Capacitative systems are subject to generally similar deficiencies and for generally similar reasons.

It is a principal object of the present invention to provide a drop-by-drop liquid control system which is highly resistive to self-induced failure or to error due to spurious signals, which has exceptionally high accuracy in respect to control of the liquid flow rate, and which may be installed and adjusted without the need for highly technical personnel.

The invention has the further object of providing highly automated electrical control apparatus which operates at a very low (entirely non-lethal) electric potential and in which even this potential is completely isolated from contact with the liquid flow stream.

In its general aspects, the apparatus of the invention employs an electrically insulated, thermally sensitive conductive system on which falling liquid drops impinge. The resulting variations in the temperature and heat dissipation rate of the conductive element produce a succession of detectable signal pulses, the rate of which may be compared with a desired (reference) pulse rate established by the operator at the time of setting the system into operation. Any detected discrepancy between the actual and the desired drop rate is converted into a control signal which activates a regulator adapted to adjust, in small increments, the permitted rate of drop flow into the intravenous system.

The particulars of the invention as well as other objects and advantages thereof will become apparent from the following detailed description taken in conjunction with the accompanying drawings in which:

Figure 1:
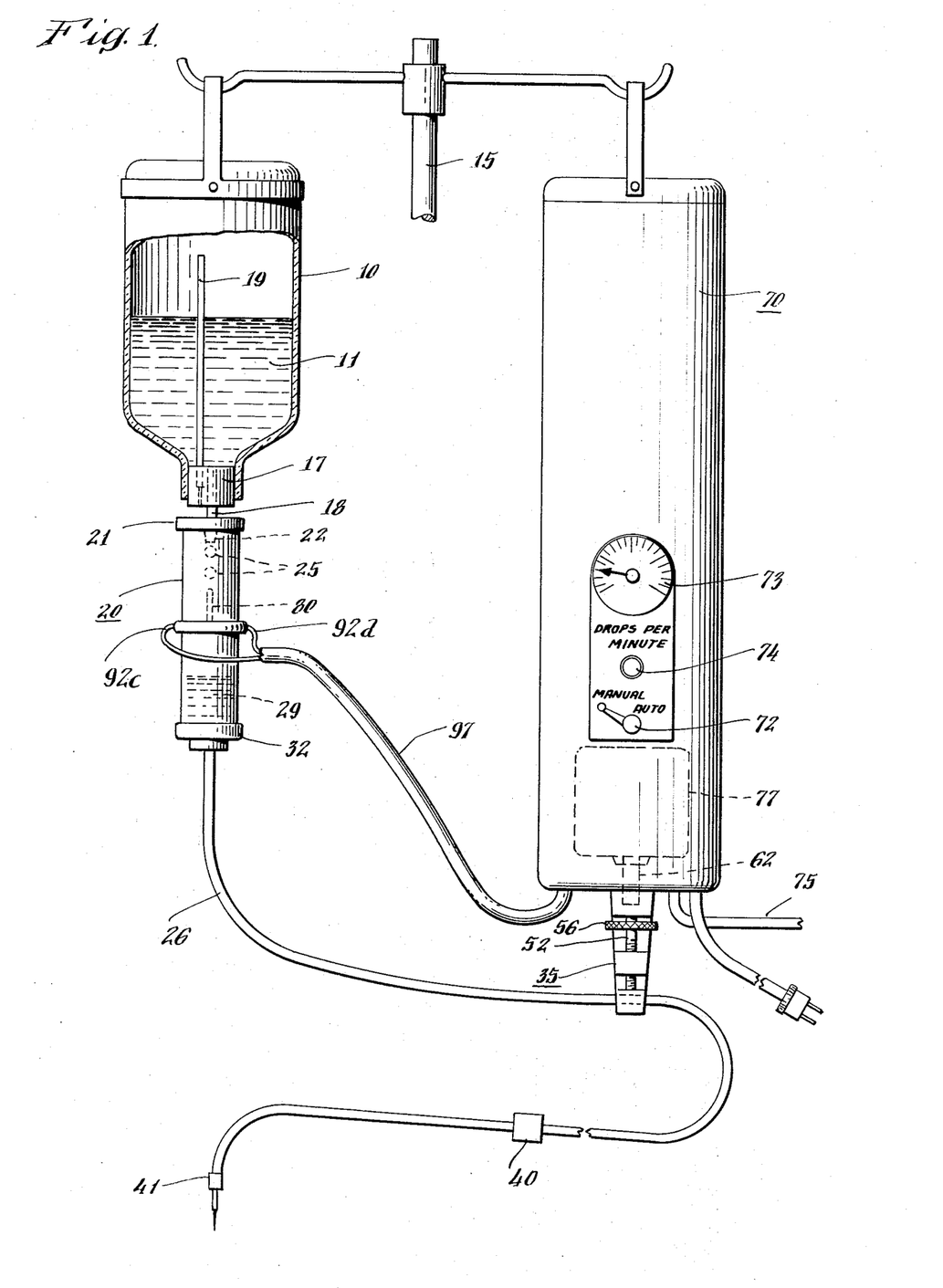
FIG. 1 is a frontal view in partial section of a packaged assemblage of the various elements of the invention.

The character and mode of application of the invention is illustrated generally in FIG. 1. In this Figure there is shown a container 10 which encloses a liquid 11 to be supplied intravenously, for example to a hospital patient, through a flexible tube 26. As is conventional in current medical practice the container 10 has a bottle-like configuration and is supported in inverted position from one of the outwardly extended arms of a support standard 15. The mouth of the container is closed by a stopper 17 through which there extends an air ingress tubulation 19. Also extending through the stopper 17 there is shown a hollow "spike" 18 which comprises part of a drip chamber assembly designated as a whole by the numeral 20. This comprises a cap member 21 provided with a drop forming station 22 having a downwardly directed opening which connects with the channel extending through the spike 18. During the fluid supplying operation of the apparatus, drops 25 are formed successively at the drop-forming station 22 and fall one at a time to the bottom of the drip chamber where they produce a pool 29. From this pool liquid escapes into the tubulation 26 shown as being connected through a cap 32 to the bottom end of the drip chamber.

The rate of escape of liquid from the pool 29 is controlled by a regulating clamp assembly 35 to be described in greater detail at a later point. As will be well understood by those skilled in the art, variations in this rate of liquid escape in turn control the back pressure in the drip chamber 20 and thus govern the rate of formation of the drops 25. As is also well understood, the intravenous flow system is completed by attaching the tube 26 to a fixed injection site as indicated at 40 and terminating it with a needle adaptor 41. An appropriately selected needle may then be connected to the adaptor 41 and introduced by a skilled attendant into the vein of the patient.

The present invention is concerned with improved means for controlling the rate of liquid flow through the tube 26. Since such control is accomplished, in the mechanical sense, by manipulation of the clamping assembly 35 the details of a preferred construction of that assembly will next be described by reference to FIG. 2 of the drawing. In that Figure, the assembly is shown as comprising a molded plastic base structure 49 having a tapped hole 50 by which it may be attached to the casing of the control apparatus 70. At its lower extremity it has a hook-like portion adapted to receive a segment of the tube 26 as shown. Extending toward and into the hook-like part 49 is a rotatable shaft 52 having a threaded engagement with the shelf-like structural part 49b. At the end of the shaft 52 which is directed toward the tube 26, it terminates in a rounded surface 54. Rotation of the shaft 52, for example in the clockwise direction, drives the part 54 into engagement with the tube 26, thus compressing it and decreasing the rate of permitted liquid flow. Rotation in the reverse direction obviously has a converse effect. For manual control of the clamping function, where this is desired, a knurled knob 56 is attached to an intermediate part of the shaft, as indicated. However, for use in connection with the principal purposes of the present invention the shaft 52 is further provided at its upper end with a keying slot 58. Into this there extends an interfitting projection 60 formed on the extremity of a motor shaft 62, the nature and function of which will be more fully explained at a later point. For present purposes it is sufficient to say that the shaft 62, when driven in one direction will rotate the shaft 52 so as to increase the clamping of the tube 26, and when driven in the other direction will decrease such clamping, thus regulating the flow of liquid through the tube.

Referring once again to FIG. 1, there is shown in the right hand portion of that Figure a control assembly which includes not only the clamping apparatus 35, but also a frame or cabinet 70 to which this assembly is secured. This cabinet is shown as being supported on the right hand bracket of the standard 15 and, by dotted outline, is also shown as enclosing a motor 77, which may be assumed to be a bi-directional device connected to and driving the shaft 62 previously described in connection with FIG. 2. The cabinet 70 still further encloses certain components of a drop rate control system now to be described in greater detail.

Figures 3, 3A, 3B:
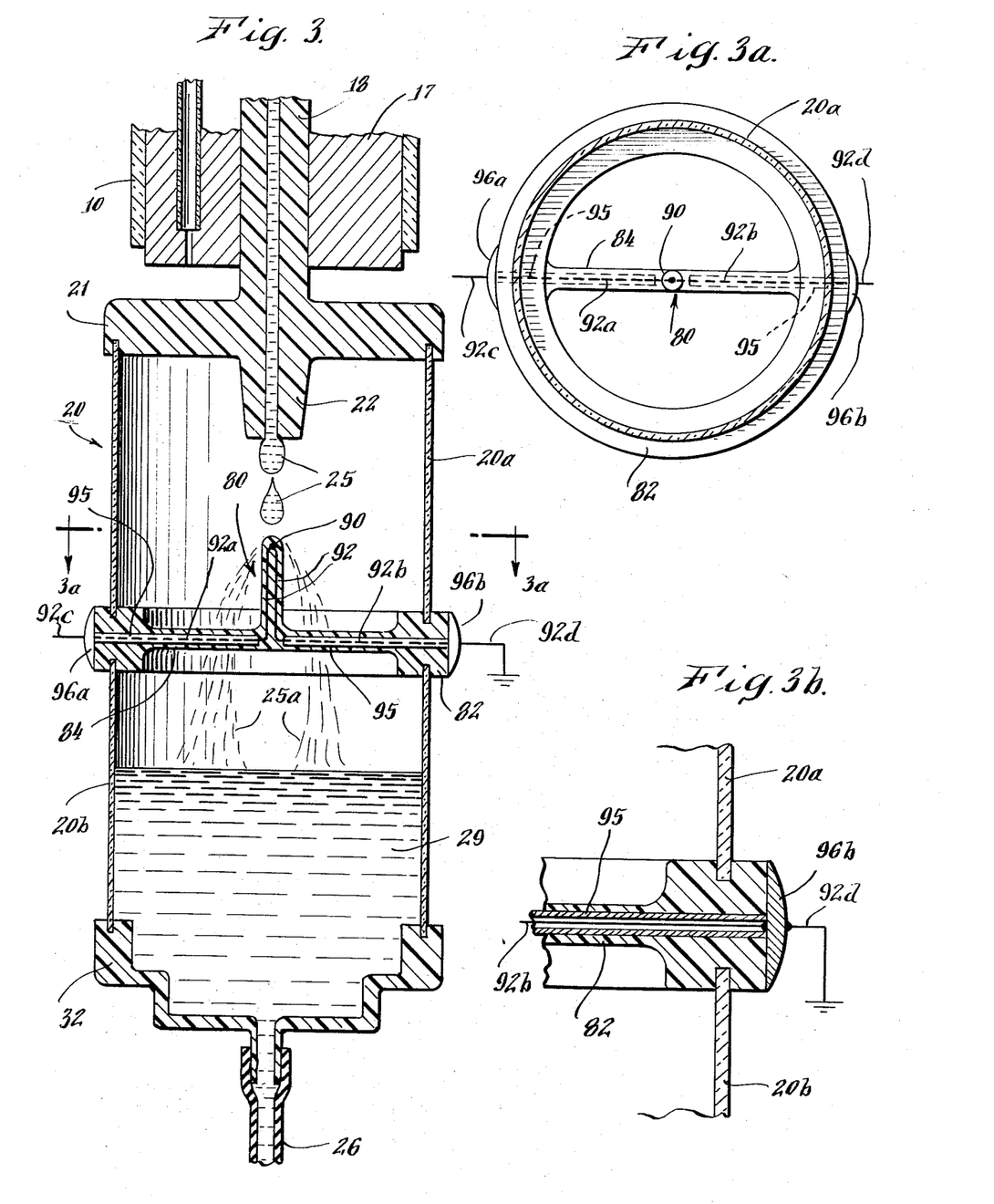
FIG. 3 is an enlarged sectional view showing a sensing element arranged within an appropriate enclosure in accordance with the invention.
FIG. 3a is a section taken on line 3a—3a of FIG. 3.
FIG. 3b is an enlarged sectional detail of one part of FIG. 3.

A key element of the control system of the present invention is a highly effective sensing device (hereafter frequently referred to as a "probe") enclosed within the drip chamber 20. This probe is indicated generally at 80 in FIG. 1, but its details of construction may best be understood by reference to FIGS. 3, 3a and 3b in which parts previously described bear the numerals already assigned to them. In FIG. 3 the enclosure 20 is shown as being formed of two coaxial cylinders 20a and 20b which may be of clear plastic. These are sealed at their facing extremities into a ring 82 of insulating plastic material (for example, a thermoplastic polyester). As more clearly appears in FIG. 3a, the plastic ring 82 has extending across its central region a bridging column 84 (also of insulating plastic) upon which is supported in an upwardly extending direction the probe 80. It is the essential character of this probe that it contain in a portion of its length positioned in the drop path an electrically conductive element, the conductivity of which is significantly variable with its temperature. A number of such conductive devices are known, including for example the type of device referred to in the art as a "sensistor." However, while by sufficient adaptation of the external apparatus, devices of the kind just named may be used, I have found that the objectives of the present invention are significantly better served by selecting the conductive element from the class of devices known as "thermistors." Accordingly, in FIG. 3 it may be assumed that the conductive element 90 shown within the upper extremity of the probe 80 is a thermistor and that it is, moreover, a thermistor of the type represented (by way of example) by Model No. GB31P2 of Fenwall Electronics Company, Framington, Mass. In the example just mentioned the thermistor per se (corresponding to the element 90 of FIG. 3) is insulatingly enclosed in the extremity of a glass-formed tubulation (the probe 80) which is about 1/10 inch in diameter and ½ inch long. From the thermistor fine conductive leads 92 extend lengthwise of the probe enclosure, being insulated throughout their length but presenting (before mounting into the present assembly) uninsulated terminal portions at the extremity of the probe remote from thermistor 90. At 25°C. the nominal resistance of the probe model referred to is specified as 1,000 ohms plus or minus 20 percent, and a probe having this resistance has been found well adapted to the purposes of the present invention. It will be understood, however, that wide variations from this value can be tolerated provided appropriate adjustments are made in the connecting circuitry (to be described at a later point).

In the application shown in FIG. 3 the extremities 92 and 92b of the leads coming from the probe are not left in exposed condition, but are on the contrary electrically isolated from the space within the drip chamber by enclosure in the plastic bridging structure 84. Moreover, as an additional safety precaution these leads are additionally shielded, at least within the interior region of the container 20, in a grounded tubular conductor 95 (see FIG. 3b). This conductor may be grounded by being connected to one of two external terminals 96a and 96b which are provided at the outer edge of the sealing ring 82 and to which the lead connections 92a and 92b of the thermistor 90 are respectively attached. It will be understood, however, that the shielding sheath 95 must itself be connected to one only of these terminals, that is to say, the terminal which is associated with the grounded portion of the external control circuit. As appears more fully in FIG. 1, conductors 92c and 92d, connecting respectively with the terminals 96a and 96b, are carried through a cable connection 97 to the control cabinet 70.

With the arrangement as so far described, it will be seen that the upper end of the elongated probe 80 is positioned directly in the path of the falling drops 25. Accordingly, to the extent that there is any difference between the temperature of the probe tip (and consequently of the conductive element 90) and the temperature of an impinging drop, the thermal exchange between the drop and the probe will change the temperature of the latter. This result is assured by the fact that the insulating material enclosing the conductive element is (as a matter of design) of such thinness (e.g., one to a few millimeters) in the vicinity of the element as not significantly to isolate it from thermal gradients created by the falling drops. It is found, moreover, that this thermal exchange is maximized by an orientation of the probe 80 such as that illustrated which presents the upper extremity of the probe to the falling drops. This arrangement, among other things, induces a laminar flow of the body of the drop along the surfaces of the probe tip. Concurrently, it minimizes either "bouncing" of the drop constituents from the probe or excessive " dwelling" of those constituents on the probe surface, either of which occurrences would be inimical to the purposes of the invention as developed in the following discussion.

Figure 4:
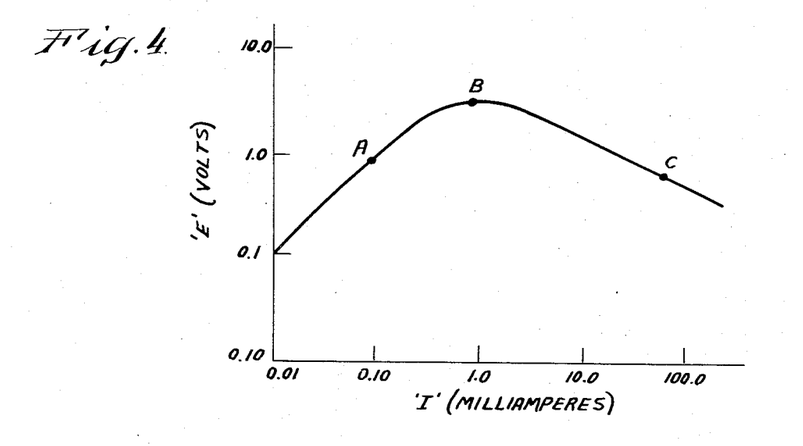
FIGS. 4, 5, and 6 are graphical representations useful in explaining the invention.

Having in mind the structural elements of the invention as so far described, it is now in order to explain in detail the ultimate control function to which the invention is to be applied. In undertaking this, it will be helpful to refer briefly to the known operating characteristics of thermistors. In this connection, FIG. 4 illustrates a typical voltage-current curve of a thermistor device. From a zero (or other very low) starting point, current will increase substantially linearly with voltage (i.e., in accordance with Ohm's law) to, say, point A. However, when a higher point, say B, is reached, significant self-heating of the thermistor will occur and, in accordance with the nature of the thermistor, its resistivity will begin to drop with the result that current will continue to increase without further increase in the impressed voltage or, indeed, even in the presence of a slightly decreasing voltage. In the absence of limiting factors in the connected circuitry, this condition may continue in runaway fashion until the maximum safe continuous current of the device has reached, say, the point C, whereupon self-destruction may begin. Assuming that the connecting circuit is constructed to avoid complete runaway, it will be seen that, as long as a device is operating in the region B-C, a decrease in current flow produced by any means may concurrently effect a rise in terminal voltage (external circuit conditions permitting).

Figure 5:
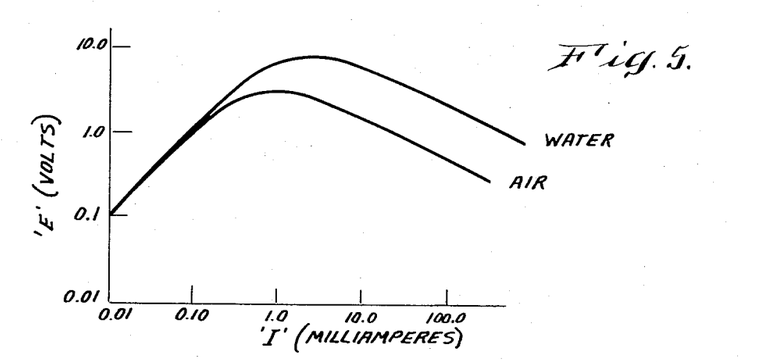

This negative volt-ampere characteristic of a thermistor is taken advantage of in connection with the present invention through use of further characteristics shown in FIG. 5. This Figure shows that the outline of a given thermistor's volt-ampere curve depends critically upon whether it is operating in an air or a water ambience. Specifically, because of the higher rate of heat dissipation resulting, the curve for a water ambience lies above that for an air ambience. Accordingly, the application of water or a similar coolant liquid to a previously air immersed thermistor will, assuming no other conditions to be changed, permit a rise in terminal voltage to occur. It is this characteristic which is taken advantage of in a novel way in the operation of the present invention, a point which is best illustrated by reference to FIG. 6 of the drawing.

Figure 6:
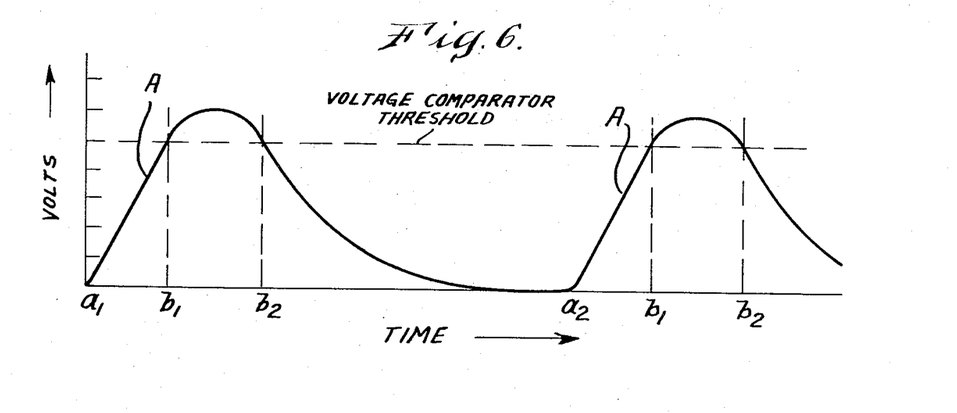

Referring to FIG. 6, let it be assumed that the points $a_1$ and $a_2$ as shown in that Figure represent the moments of impingements of successive liquid drops on the probe 80 of FIGS. 1 and 3. Assuming (as will be shown later to be the pre-arranged case) that the temperature of the probe is above the drop temperature, the probe — and consequently the conductive element 90 — will first be progressively cooled as the drop impinges on and envelops the probe tip and then will return to its normal (i.e., its air-immersed) temperature as the drop flows off the probe and passes down into the pool 29 as suggested at 25a in FIG. 3. Under these conditions (and assuming substantially constant or decreasing current flow) the voltage at the terminals of conductive element 90 will, for the reasons previously given, rise as the cooling effect of the impinging drop increases to a maximum and then fall as the drop flow-off occurs. The resulting quasi-sinusoidal waveform as it appears at the external terminals 92c and 92d is shown at A in FIG. 6. Application of the results of these occurrences for purposes of the present invention will now be described by reference to FIG. 7.

Figures 2, 2A:
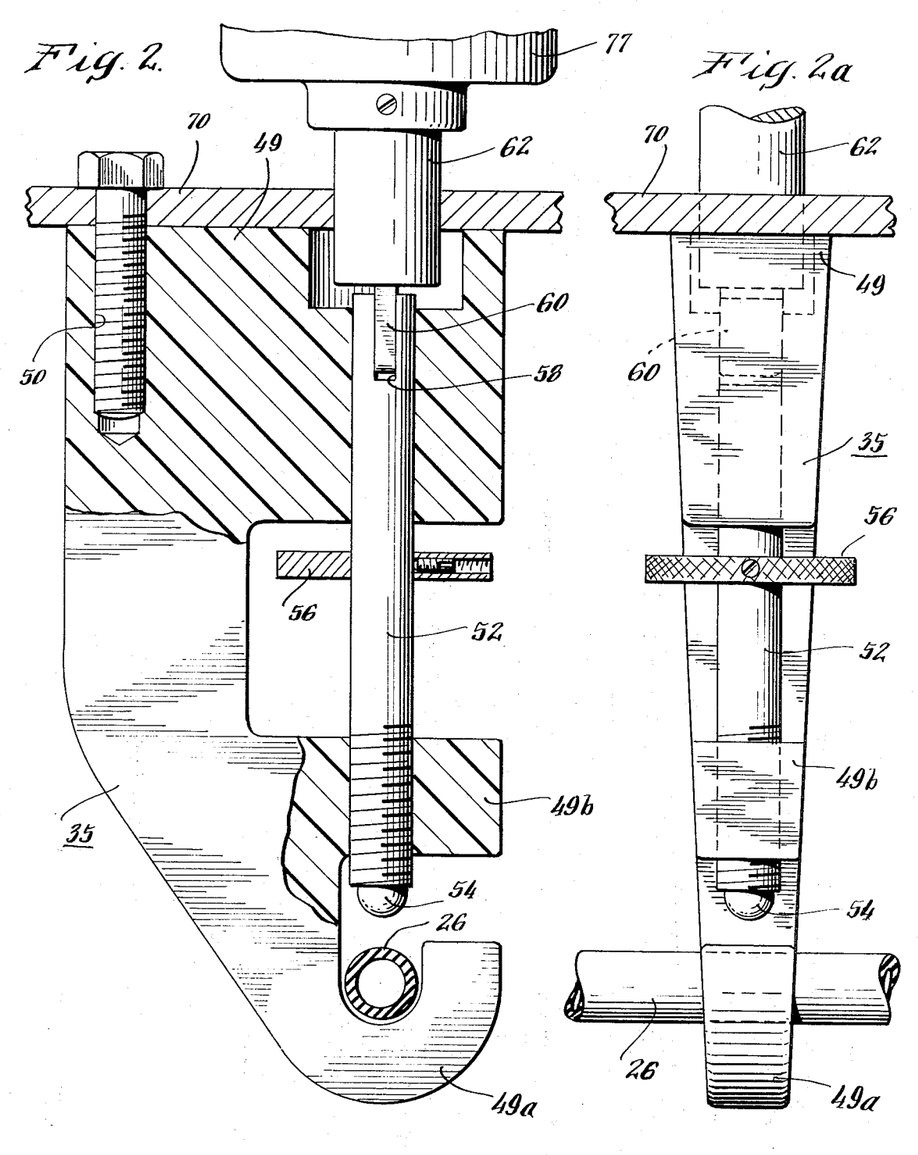
FIGS. 2 and 2a are related enlarged cross-sectional views of a preferred form of regulating tube clamp for use in connection with the invention.
Figure 7:
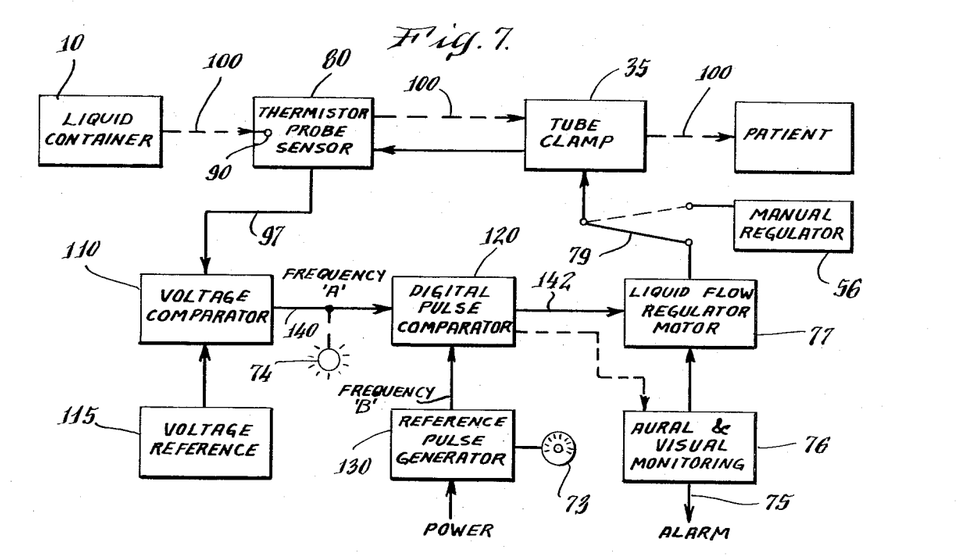
FIG. 7 is a functional block diagram of the system aspects of the invention.

In FIG. 7 the path of liquid flow from the container 10 (FIG. 1) to the thermistor probe 80 and thence to the clamping assembly 35 and finally to the patient is indicated diagrammatically by the dash line 100. As the liquid, in the form of drops, impinges on the thermistor probe 80 it produces the voltage pulses just described in connection with FIG. 6. It best serves the purposes of the present invention to convert these quasi-sinusoidal half-wave pulses into steep wavefront pulses for application in a digital pulse system. For this purpose the half-wave pulses are applied through connection 97 to a voltage comparator 110 in which they are compared with a fixed voltage derived from a reference source 115. The result of such comparison is suggested in FIG. 6 which shows against the outline of the pulses A the horizontal line representing the voltage comparator threshold. It is the function of the voltage comparator to generate within the interval $b_1 - b_2$ a square wave output pulse A' (see FIG. 8b) which, in the system of FIG. 7, is transmitted through connection channel 140 to a digital pulse operator comparator The frequency of the pulses so generated and transmitted will, of course, correspond to the drip frequency of the drops 25 and may, for convenience, be designated frequency A. The digital pulse comparator 120, in turn, compares these pulses as to frequency with pulses of a frequency B supplied to it by a variable reference generator 130. If the two frequencies are precisely matched, the comparator 120 will produce no signal output. If, on the other hand, frequency A exceeds frequency B, an output signal of one energizing polarity will be produced, whereas if frequency A is less than frequency B a signal of the opposite energizing polarity will occur. Whichever signal occurs is fed through channel 142 to the motor 77 associated (FIG. 1) with the regulator clamp assembly 35. Depending upon the energizing polarity of the signal, the motor will be turned in a direction either to increase or decrease the degree to which the tube 26 is compressed by the part 54 of the shaft 52 (FIG. 2). In order to permit this type of operation the motor 77 must be bi-directional, as previously specified, and is preferably of the type which produces a "one-shot" stepping motion in the desired direction with each signal pulse received. With this arrangement the motor will continue to receive periodic energizing signals in a given direction as long as a discrepancy continues to exist between the drip frequency A (as detected by the thermistor 90) and the reference pulse frequency B supplied by the generator 130. It will be understood that increasing closure of the tube 20 by the clamping arrangement 35 increases the average back-pressure maintained in the drip chamber 20 (FIG. 1) and thus indirectly fixes the rate at which drops will be permitted to form and fall from the drop orifice 22. As soon as the difference between the drip rate and the reference pulse rate reaches zero, energization of the motor 77 will cease and all elements of the system will remain fixed until and unless a further discrepancy of signals arises.

It will be understood that the control apparatus as so far described may be housed in the cabinet enclosure 70 shown in FIG. 1. This is provided with externally accessible manual controls of which a device 72 for switching the operation of the apparatus from manual to automatic is one. As long as this device is in the "Manual" position, control of the regulating clamp assembly 35 will be wholly subject to action of the operator. However, if automatic operation of the equipment is desired, the switching device 72 is thrown to the "Auto" position, whereupon the regulating system of FIG. 7 assumes control of the drip rate of liquid in the chamber 20. While it is assumed that this drip rate will have been initially adjusted to approximately the desired value by manipulation of the regulating knob 56 (FIG. 1), final adjustment is accomplished by turning the dial 73 to the desired "drops per minute" setting. As is diagrammatically suggested in FIG. 7, this adjustment controls the reference pulse generator 130 to produce the selected reference frequency B. At the same time, an observation lamp 74 mounted on the face of the cabinet 70 (FIG. 1) starts flashing continuously and in synchronism with the fluid drop rate, which can also be observed in the drip chamber 20. Later, if the treatment fluid 11 is not replenished by an attendant, so that zero drop flow develops in the drip chamber 20, an alarm signal is transmitted through a cable 75 (FIG. 1) to an aural and visual monitoring circuit (not shown in FIG. 1, but indicated diagrammatically at 76 in FIG. 7) and an alarm (aural or visual) is given at the nurse's station. Simultaneously, the signal from the monitoring system 76 to the liquid flow regulator motor 77 causes it to close completely the tube 26, thus stopping further flow of the treatment liquid. At the same time, the lamp 74 changes from a flashing to a steady light indication. Under still other such circumstances, if a power outage or an out-of-limit condition occurs, the nurse's station will receive an alarm, and the lamp 74 will be extinguished. In these circumstances, the switch-over device 72 should, of course, be changed from "Auto" position to "Manual," and further operation of the equipment maintained under manual control.

Figures 8, 8A:
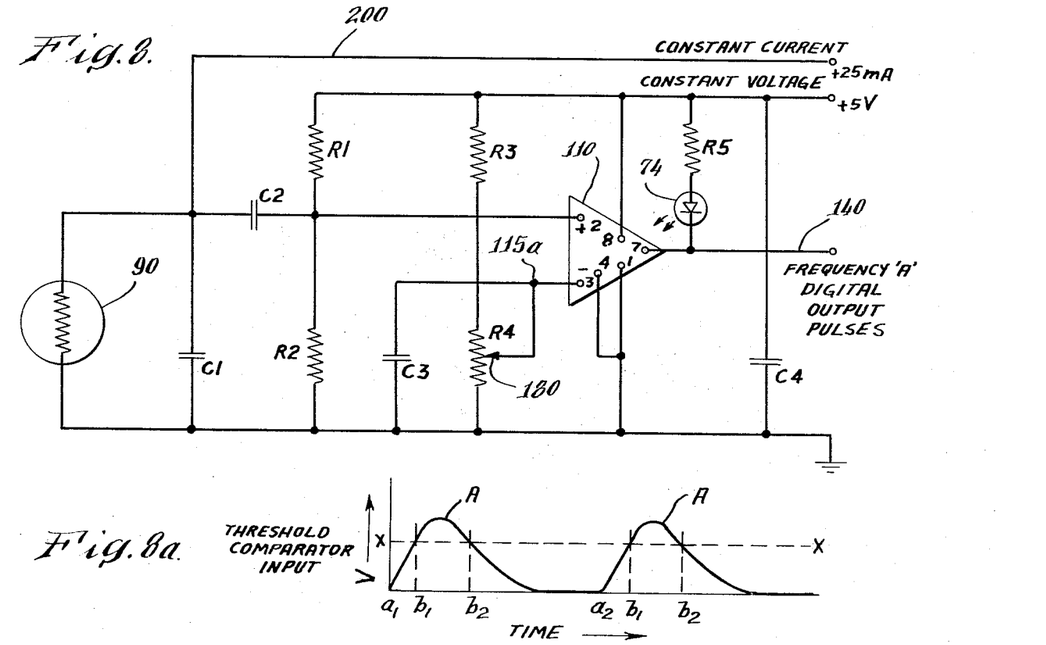
FIG. 8 is a schematic diagram of certain preferred circuitry used in connection with the invention.
FIGS. 8a and 8b are graphical representations useful in explaining the operation of the circuit of FIG. 8.
Figure 8B:
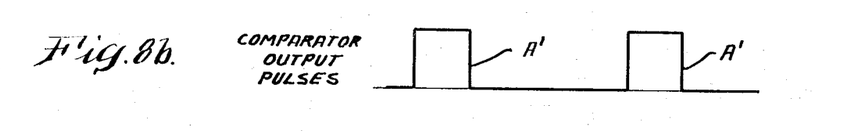

Because of the critical role which it plays in the operation of the apparatus, there is shown in FIG. 8 a preferred circuit for the voltage comparator 110 by which the half-wave, quasi-sinusoidal output of the thermistor 90 is converted into frequency A digital output pulses, the frequency of which is to be compared with the frequency of output of the reference pulse generator 130 (FIG. 7). As is indicated at the right of FIG. 8, the comparator circuit is provided with a constant dc voltage (e.g., 5 volts) connected across a voltage stabilizing condenser $C_4$, across series-connected voltage-dividing resistors $R_1$ and $R_2$ and also across series connected resistors $R_3$ and $R_4$, the second of which has an adjustable contact point as indicated at 180. The thermistor 90 (or equivalent thermally responsive device) is shown at the left of the drawing. This is supplied through lead line 200 with a constant value biasing current of (in the case of the preferred thermistor) about 25 Milliamperes. This current should in any event be high enough to maintain the temperature of the conductive element 90 (FIG. 3) at a level significantly above that of the liquid supply 11 and also at a level corresponding to its negative resistance range. Since the latter will normally be at or near room temperature, a temperature range of 50°C. to 75°C. for the thermistor would ordinarily be appropriate. Under these conditions, impact of a liquid drop on the tip of the thermistor probe would reduce its transitorily transistorily in the manner already described. Moreover, in light of the operating characteristics of a thermistor working in its negative resistance range, (as explained in connection with FIGS. 4 and 5) the voltage across its terminals would rise momentarily (and quasi-sinusoidally). During this occurrence, the current from the constant current supply would temporarily divide between the thermistor and the capacitor $C_1$. Under these circumstances, a voltage waveform corresponding to that appearing across the terminals of the thermistor 90 would be transmitted through the coupling capacitor $C_2$ to input terminal 2 of the comparator device 110. This device may be, for example, a commercially procurable analog-to-digital comparator-converter such as Catalog Model No. LM311N of the National Semiconductor Corporation, Santa Clara, California. In the present application, terminals 1 and 4 of the comparator are grounded terminals. A second input terminal 3 is supplied from the constant voltage dc source already referred to by connecting it to the variable contact point 180 of the resistor $R_4$. In the intended operation of the apparatus, setting the resistor contact point 180 effectively selects a reference voltage to be supplied through a junction point 115a (corresponding to the output terminal of the reference voltage element 115 shown in FIG. 7) to the terminal 3. A voltage-stabilizing capacitor $C_3$ is connected from this terminal to ground.

In practice, the adjustable resistor $R_4$ is set to provide to the comparator 110 a threshold voltage input represented, by way of example, by the horizontal line X—X of FIG. 8a. This threshold is pre-adjusted (i.e., by the resistor $R_4$) to be below the peak voltage of the quasi-sinusoidal pulses A being received from the thermistor 90 at terminal 2 of comparator 110. Under these circumstances, the comparator, if of the type specified above, will, during the period in which the pulses A exceed in magnitude the threshold level X—X, produce at the comparator output terminals 7 and 8 digital (square waveform) pulses which resemble those shown at A' in FIG. 8b. These pulses will, of course, have the same frequency as the quasi-sinusoidal pulses received from the thermistor 90 and will, in accordance with the invention, be supplied from terminal 7 of comparator 110 to the digital pulse comparator 120 of FIG. 7 through a lead line 140 corresponding to the similarly numbered lead line represented in FIG. 7. The identical pulses produced at terminal 7 of comparator 110 will be conducted to the signal lamp 74 through a current limiting resistor $R_5$, producing the flashing output previously referred to.

In a comparator circuit of the type just described, and assuming use of a thermistor and a solid state comparator having the specifications respectively ascribed in the foregoing to items 90 and 110, the following circuit constants for the remaining elements of the circuit have been found appropriate:

$R_1$ – 47K ohms, 1/4 watts
$R_2$ – 47K ohms, 1/4 watts
$R_3$ – 2.4K ohms, 1/4 watts
$R_4$ – variable from zero to 5K
$R_5$ – 150 ohms, 1/4 watts
Lamp 74 – solid state light-emitting diode (LED), 1.6 V
$C_1$ – 10 $\mu$F, 16 vdc
$C_2$ – 6 $\mu$F, 16 vdc
$C_3$ – .01 $\mu$F, 16 vdc
$C_4$ – .05 $\mu$F, 16 vdc A liquid control system of the type described above has the following advantages, among others:

1. It is substantially immune to the influence of spurious signals.
2. It has high accuracy and is simple for unskilled personnel to operate.
3. It operates at a very low and entirely safe electrical potential, and even this potential is fully isolated from contact with the liquid flow stream.

While the invention has been described by reference to a preferred example, this is to be taken as illustrative rather than limiting. Accordingly, the invention should be construed consistently with the true spirit and scope of the following claims.

What is claimed is:

1. Apparatus for sensing the passage of liquid drops successively falling along a predetermined vertical path, said apparatus comprising:
   A. an enclosure including means for establishing a vertical drop path; and
   B. a probe mounted within the enclosure and having a portion positioned directly in the drop path, said probe comprising
      1. an electrically conductive element located in that portion of the probe which is positioned in the drop path, the conductivity of the element being significantly variable with its temperature,
      2. a pair of leads connected with the conductive element and having terminals outside the enclosure for conducting current to and from the conductive element, and
      3. insulating material enclosing both the conductive element and the portion of the leads within the said enclosure and electrically isolating them from falling drops, such material being, however, of such thinness in the vicinity of the conductive element as not significantly to isolate the element from thermal gradients created by drops falling successively on that portion of the probe which is positioned in the drop path.

2. Apparatus according to claim 1 in which the transverse dimension of that portion of the probe positioned directly in the drop path is comparable with or less than the diameter of the falling drops.

3. Apparatus according to claim 1 in which the conductive element is a thermistor.

4. Apparatus according to claim 1 in which means are connected to the terminals of the leads for supplying heating current to the conductive element during its use for drop-sensing purposes to maintain it at an average temperature above the predictable temperature of the falling drops.

5. Apparatus for sensing the passage of liquid drops successively falling along a predetermined vertical path, said apparatus comprising:
   A. an enclosure including means for establishing a vertical drop path; and
   B. an elongated probe mounted within the enclosure which has
      1. a transverse dimension comparable with or less than the diameter of the falling drops,
      2. an extended major axis substantially coincident with the central axis of the predetermined drop path, and
      3. an upwardly projecting end which lies directly in the drop path; said probe comprising:
      4. an electrically conductive element within the upwardly projecting end of the probe; the conductivity of said element being significantly variable with its temperature,
      5. a pair of leads connecting with the conductive element and having terminals outside the enclosure for conducting current to and from the conductive element,
      6. insulating material enclosing both the conductive element and the portion of the leads within the said enclosure and electrically isolating them from falling drops, such material being, however, of such thinness in the vicinity of the conductive element as not significantly to isolate the element from thermal gradients created by drops falling successively on the upwardly directed end of the probe, whereby periodic variations in the conductivity of the element produced by successively falling drops may be detected at the terminals of the leads.

6. Apparatus according to claim 5 in which the conductive element is a thermistor.

* * * * *